Figure 1:
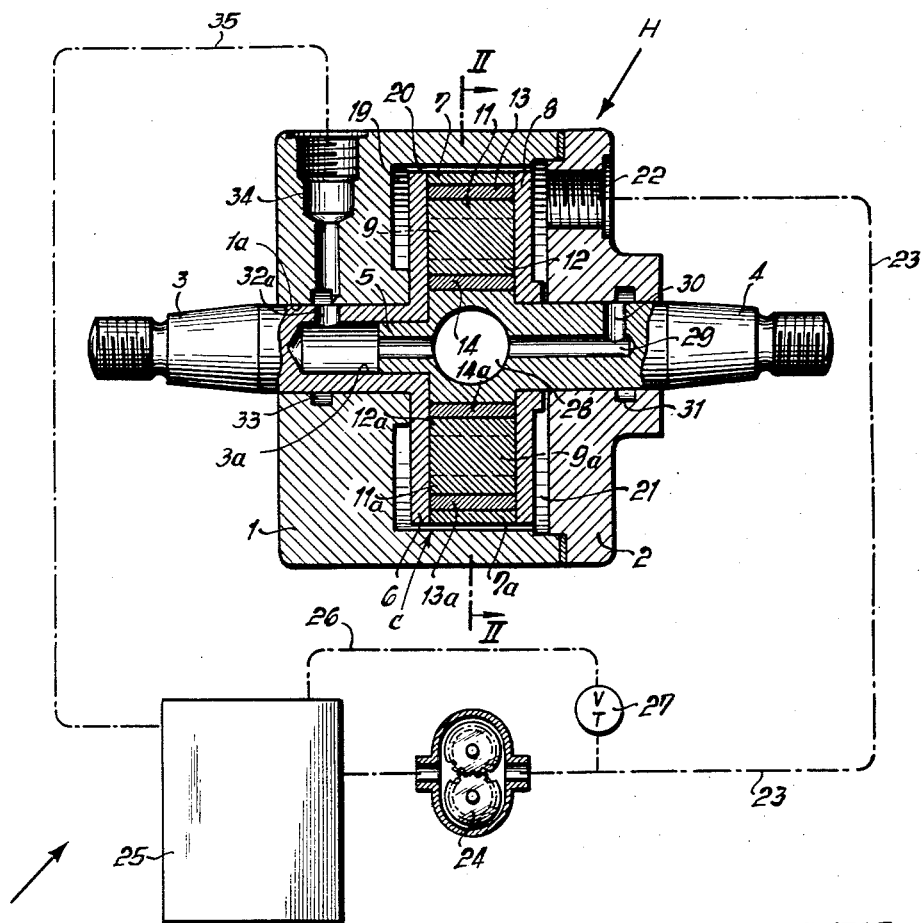

2,950,610

HYDRAULIC SYSTEM FOR AUTOMATICALLY ADJUSTING THE RELATIVE ANGULAR POSITION OF TWO COAXIAL ROTARY BODIES

Reinhart Stier, Sindelfingen, Kreis Boblingen, Germany, assignor to Robert Bosch G.m.b.H., Stuttgart, Germany Filed Nov. 24, 1959, Ser. No. 855,111

Claims priority, application Germany, Nov. 29, 1958

8 Claims. (Cl. 64—24)

The present invention relates to a hydraulic adjusting system for automatically varying the angular position of a first rotary body with respect to a second rotary body which is coaxial with the first body. Such adjusting systems may be utilized, among others, in fuel injection pumps for internal combustion engines. Their adjusting action is then proportional with variations in the prevailing fluid pressure which, in turn, varies at a rate proportional with the angular speed of the rotary bodies.

An important object of the present invention is to provide a hydraulic adjusting system of the above outlined characteristics whose working capacity is considerable though it occupies very little space, and which is capable of immediately changing the angular position of two revolving coaxial shafts in response to comparatively small changes in the fluid pressure prevailing therein.

Another object of the invention is to provide a hydraulic system for automatically adjusting the relative angular position of two driven coaxial shafts which is constructed in such a way that comparatively small changes in prevailing hydraulic pressures may bring about comparatively large angular displacements of one shaft with respect to the other shaft.

A further object of the instant invention is to provide a hydraulic adjusting system of the above outlined type which comprises a very small number of component parts, which utilizes small quantities of a hydraulic pressure medium, and which may be readily installed in many types of apparatus where an angular adjustment of one rotary body with respect to another rotary body is desired.

A concomitant object of the present invention is to provide a hydraulic system for adjusting the relative angular position of two coaxial rotary bodies which operates with a large transmission ratio and which, therefore, may bring about considerable changes in the angular position of the bodies controlled thereby in response to changing pressure of hydraulic fluid contained therein.

With the above objects in view, the invention resides essentially in the provision of a hydraulic adjusting and control system which defines a pressure chamber at least one wall of which assumes the shape of a pivotable wing, and in which each such wing is constantly biased in a direction to move counter to the action of pressures prevailing in the chamber. The system preferably comprises two pivotable wings which are mounted for limited angular movements in a plane perpendicular to the common axis of two shafts whose angular position must be controlled. Each wing has one of its ends articulately connected with both shafts and, when moved under the action of varying pressures prevailing in the pressure chamber, brings about controlled angular adjustments of one shaft with respect to the other shaft.

Another feature of the improved hydraulic system resides in a novel arrangement of channels for collecting the leak oil which escapes from the pressure chamber.

Figure 2:
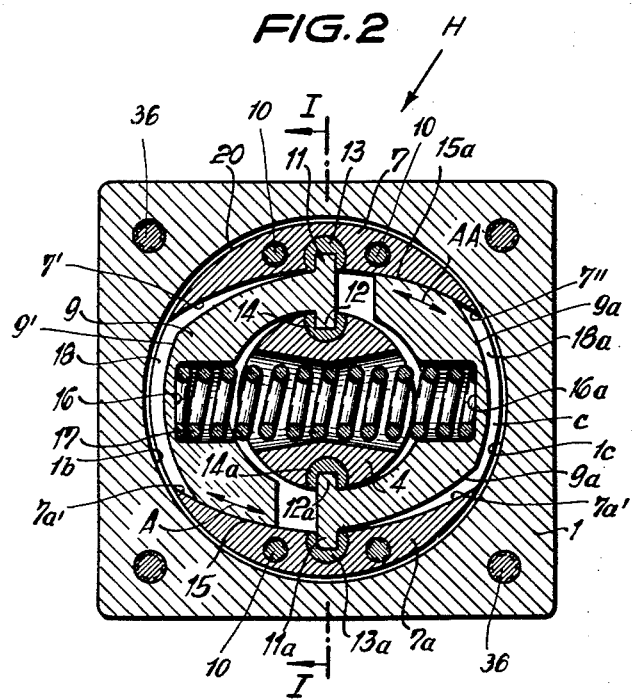

The novel features which are considered as characteristic for the invention are set forth in particular in the appended claims. The invention itself, however, both as to its construction and its method of operation, together with additional objects and advantages thereof, will be best understood from the following detailed description of a preferred embodiment when read in connection with the accompanying drawings, in which:

Fig. 1 is a longitudinal section through the improved hydraulic adjusting system, such as may be utilized in fuel injection pumps of internal combustion engines, the section being taken along the line I—I of Fig. 2, as seen in the direction of arrows; and Fig. 2 is a transverse section through the housing of the adjusting system, as seen from the line II—II of Fig. 1 in the direction of arrows.

Referring now in greater detail to the drawings, and first to Fig. 1, there is shown a hydraulic adjusting system S comprising a two-piece housing H consisting of parts 1 and 2 which are connected to each other by bolts 36 (Fig. 2) and which define therebetween a tightly sealed cylindrical compartment C for reception of the adjusting mechanism. Housing parts 1, 2 are formed with coaxial bores 1a, 2a for a pair of rotary shafts 3, 4, respectively. That end of the shaft 4 which extends into the housing H is formed with a hollow cylindrical extension or trunnion 5 which is rotatably received in the blind axial bore 3a of shaft 3. The latter's inner end is formed with a discoid flange 6 which supports two symmetrically arranged half-moon shaped member 7, 7a. These members are rigidly fixed to the flange 6 by bolts 10, and are also connected with a disc 8 which is rotatably mounted on the shaft 4, i.e. the bolts 10 extend through the flange 6, through the member 7 or 7a, and through the disc 8.

The shaft 3 with its flange 6, the members 7, 7a and the disc 8 constitute a rigid unit and represent one adjustable component of the system S. The shaft 4 constitutes the other adjustable component, i.e. the system operates in such a way as to angularly adjust the position of the shaft 4 with respect to the parts 3, 6, 7, 7a and 8, or vice versa. The two components are adjustably connected by a pair of wing-shaped elements 9, 9a, best shown in Fig. 2. The thickness of elements or wings 9, 9a corresponds to the distance between the flange 6 and the disc 8. Each wing is formed at one of its ends with a non-circular outer projection or rib 11, 11a, respectively, which extends all the way between the members 6, 8, and the same end of each wing is formed with a similar inner projection or rib 12, 12a, respectively. The half-moon shaped member 7 rotatably receives a cylindrical articulation piece or joint 13 which is formed with a longitudinal recess into which the rib 11 extends. The other half-moon shaped member 7a rotatably supports a similar cylindrical articulation piece or joint 13a which receives the rib 11a. The axes of joints 13, 13a are parallel with the common axis of shafts 3 and 4, and these joints are arranged at diametrically opposite sides of the shaft 4. The latter rotatably supports two additional cylindrical articulation pieces or joints 14, 14a which are formed with longitudinal grooves or recesses for the ribs 12, 12a, respectively. The joints 14, 14a are disposed at diametrically opposed sides of the shaft 4 and extend in parallelism with the latter's axis between the flange 6 and the disc 8. Owing to such mounting, the wing-shaped elements 9, 9a are swingable in the housing H in directions indicated by the double arrows A, AA, respectively. More particularly, the wing 9 is swingable about the axis of articulation piece 13, and the other wing 9a may pivot about the axis of joint 13a. The wings 9, 9a are formed with arcuate sealing surfaces 15, 15a, respectively, whose center of curvature coincides with the axes of joints 13, 13a, respectively. When the wing-shaped element 9 pivots in the directions of arrow A, its sealing surface 15 slides along the equally curved inner side of the half-moon shaped member 7a, and the other sealing surface 15a is slidable along the arcuate inner side of the member 7 whenever the element 9a is rotated about the axis of joint 13a in the direction indicated by the double arrow AA. When the wings 9, 9a pivot, the shaft 4 is angularly displaced with respect to the shaft 3. A resilient element, here shown as a helical expansion spring 17, constantly tends to pivot the wings 9, 9a in a direction away from each other. The terminals of the spring 17 are received in internal blind bores 16, 16a formed in the elements 9, 9a, respectively. The axis of spring 17 is perpendicular to the common axis of the shafts 3, 4. As can be observed in Fig. 2, the resilient element 17 tends to pivot the parts 9, 9a in clockwise direction about the articulation pieces 13, 13a, respectively, which could bring about anticlockwise rotation of the shaft 4 with respect to the shaft 3.

The wings 9, 9a, and more particularly their portions extending between the members 7, 7a, constitute two movable or adjustable walls of a composite pressure chamber 18, 18a. The fixed walls of this chamber are formed by the housing part 1, by the flange 6, by members 7, 7a, and by the disc 8. The chamber portion 18 is bounded by the outer side 9' of movable element 9 which extends between the rib 11 and the surface 15; by the inner side 1b of the housing part 1 in the compartment C; by certain zones of the inner surfaces on the flange 6 and disc 8; by the inner side 7' of the member 7 between the rib 11 and the surface 1b; and by the inner side 7a' of the member 7a between the sealing surface 15 and the surface 1b. The other portion 18a of the pressure chamber is bounded by the outer side 9a' of the movable wing 9a between the rib 11a and the sealing surface 15a; by the inner side 1c of the housing part 1 in compartment C; by certain zones of the inner surfaces on the flange 6 and disc 8; by the inner side 7a'' of the member 7a between the rib 11a and the surface 1c; and by the inner side 7'' of the member 7 between the surface 1c and the sealing surface 15a.

It will be noted that the diameters of flange 6 and disc 8 are somewhat smaller than the diameter of compartment C; therefore, an annular space 20 is formed between the surfaces 1b, 1c on the one hand, and between the end faces of members 6, 7, 7a and 8 on the other hand. Thus, a hydraulic pressure medium, e.g. oil, may communicate between the pressure chamber portions 18, 18a by flowing in the annular space 20. This space further communicates with the interior of an annular recess 19 which is formed in the housing part 1 adjacent to the outer side of the flange 6, and also with the interior of a similar annular recess 21 formed in the outer side of the discoid member 8. It will be seen that the annular space 20 and the interior of recesses 19, 21 constitute part of the pressure chamber 18, 18a.

The interior of the recess 21 communicates with an inlet opening 22 formed in the housing part 2 and serving as a means for introducing a compressed fluid medium which flows through the supply conduit 23. The latter is connected to the pressure side of a schematically represented rotary pump 24 whose suction side is connected to a supply tank or reservoir 25. A branch line 26 connects the conduit 23 with the fluid source of reservoir 25 and contains an overflow throttle or pressure regulating valve 27. The pump 24 rotates at the exact speed of shafts 3 and 4; therefore, any increase in the rotational speed of these shafts will occur simultaneously with an increase in the feed pressure of hydraulic fluid at the pressure side of the pump 24, as well as in the conduit 23 and in the composite pressure chamber 18, 18a, 19, 20, 21.

The wing-shaped elements 9, 9a enclose with the members 6, 7, 7a and 8 an inner chamber 28 which is sealed from the composite pressure chamber and contains the aforementioned resilient element 17. This inner chamber 28 collects hydraulic fluid, i.e. leak oil, which escapes along the sealing surfaces 15, 15a of elements 9, 9a, respectively. The leak oil is free to flow through an axial bore 29 in the shaft 4, through the latter's radial bore 30 and into or from an annular channel 31 which is formed in the housing part 2. The channel 31 also collects leak oil which escapes from the recess 21 along the outer side of disc 8 and along the periphery of rotary body 4.

The blind axial bore 3a of shaft 3 communicates with the axial bore 29 in member 4, and also with a radial bore 32 in shaft 3 which leads into an annular channel 33 formed in the housing part 1 for collecting leak oil which escapes from the recess 19 along the outer side of flange 6 and about the periphery of shaft 3. Thus, the channels 31, 33 communicate with each other over bores 30, 29, 3a and 32, and also communicate with the inner chamber 28. The leak oil assembled in the annular channel 33 is discharged through an outlet 34 and flows through a return line or conduit 35 back into the supply tank 25.

The hydraulic adjusting system S operates as follows:
If the rotational speed of shafts 3, 4 increases, the feed pressure at the pressure side of the rotary pump 24 also increases, and the pressure fluid which fills the line 23 and the pressure chamber 18, 18a, 19, 20, 21 causes the wing-shaped elements 9, 9a to pivot about the respective articulation pieces 13, 13a against the expanding action of coil spring 17. Thus, the wings pivot in a plane perpendicular to the common axis of members 3, 4 and in a direction toward each other to thereby rotate the shaft 4 in clockwise direction (Fig. 2). The mounting of wings 9, 9a is such that their centrifugal force assists the action of the spring 17, i.e. the centrifugal force of wings 9, 9a, which latter always rotate with the shaft 3, acts against the pressure of fluid in the composite pressure chamber. When the rotational speed of shafts 3, 4 decreases, the pressure of fluid at the output side of pump 24 drops, and the expanding spring 17 pivots the wings 9, 9a in a direction away from each other whereby the shaft 4 is caused to pivot in anticlockwise direction with respect to the shaft 3. Thus, a certain angular position of the shaft 4 with respect to the other rotary body 3 corresponds to each given pressure of fluid in the composite pressure chamber and at the output side of the rotary pump 24.

When the above described hydraulic adjusting system is used in a fuel injection pump for internal combustion engines, the shaft 3 may be connected to a drive shaft which also rotates the pump 24. The shaft 4 is connected to the distributor piston of the fuel injection pump and, whenever angularly adjusted with respect to the shaft 3, causes the piston to change the exact timing of fuel injection into the engine cylinders.

Of course, the hydraulic adjusting system may operate with a single wing-like element, if desired. This will be readily understood merely by considering that, say, the wing 9a be replaced in Fig. 2 by a part which extends between the members 7, 7a and prevents the flow of hydraulic fluid from the chamber portion 18a into the inner chamber 28. The other wing 9 alone can bring about angular displacements of the shaft 4 with respect to the rotary body 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A hydraulic system for automatically adjusting the relative angular position of two driven coaxial bodies in response to variations in hydraulic pressures which vary proportionally with the rotational speed of said bodies, the system comprising, in combination: a housing rotatably mounting the bodies and defining a sealed compartment therewithin; at least one wing-shaped element having one end articulately connected with the rotary bodies for rotation with respect thereto about a pair of axes parallel with the common axis of said bodies and mounted in said compartment for pivotal movements in a plane perpendicular to the common axis of said bodies, the wing-shaped element defining with said housing a pressure chamber; pump means driven at the rotational speed of said bodies and having a pressure side connected with said chamber for supplying a hydraulic fluid into the latter whereby the fluid pivots the wing-shaped element and the latter angularly displaces one rotary body with respect to the other rotary body; and resilient means constantly biasing the wing-shaped element in a direction counter to the action of fluid pressure in said chamber.

2. A hydraulic system for automatically adjusting the relative angular position of two driven coaxial shafts in response to variations in hydraulic pressures which vary proportionally with the rotational speed of said shafts, the system comprising, in combination: a housing rotatably mounting the shafts and defining a sealed compartment into which one end of each shaft extends; a pair of wing-shaped elements in said compartment, each element having one end articulately connected to both shafts for rotation with respect thereto about a pair of axes perpendicular to the common axis of said shafts and both elements pivotable in a plane perpendicular to the common axis of the shafts, said elements having outer sides defining with the housing a pressure chamber; means including a rotary pump driven at the speed of said shafts and having a pressure side connected to said chamber for delivering into the latter a hydraulic fluid at pressures which vary proportionally with the rotational speed of said shafts whereby the elements are pivoted by the fluid in said chamber and angularly displace one shaft with respect to the other shaft; and resilient means operating between said elements for constantly biasing the same in a direction counter to the action of fluid pressure in said chamber.

3. In a hydraulic adjusting system, in combination: a housing defining therewithin a sealed compartment and having a pair of coaxial bores communicating with said compartment; a first driven shaft mounted in one of said bores and having a discoid flange in said compartment; a second shaft driven at the speed of said first shaft and mounted in the other bore of said housing; a disc rotatably supported by the second shaft in said compartment; a pair of symmetrically arranged substantially half-moon shaped members fixed to said flange and to said disc and forming a rigid unit with the first shaft; a pair of substantially wing-shaped elements mounted for pivotal movements between said flange and said disc in a plane perpendicular to the common axis of said shafts, one of said elements having one end pivotally connected to one of said members and to the second shaft and another end slidable along the other member, and the other element having an end pivotally connected to the other member and to the second shaft and another end slidable along said one member, said elements having outer sides defining with said housing, with said members, with said disc and with said flange a pressure chamber in said compartment, and said elements constituting the movable walls of said chamber; pump means driven at the rotational speed of said shafts and having a pressure side connected with the pressure chamber for delivering into the latter a hydraulic fluid at pressures which vary proportionally with the rotational speed of said shafts whereby the fluid pivots said elements and the elements angularly displace one of the shafts with respect to the other shaft; and resilient means operating between said elements for constantly biasing the same against the action of fluid pressure in said chamber.

4. In a hydraulic adjusting system, in combination: a housing defining therewithin a sealed compartment and having a pair of coaxial bores communicating with said compartment; a first driven shaft mounted in one of said bores and having a discoid flange in said compartment; a second shaft driven at the speed of said first shaft and mounted in the other bore of said housing; a disc rotatably supported by the second shaft in said compartment; a pair of symmetrically arranged substantially half-moon shaped members fixed to said flange and to said disc at diametrically opposed sides of the second shaft and forming a rigid unit with the first shaft; a pair of substantially wing-shaped elements mounted for pivotal movements between said flange and said disc in a plane perpendicular to the common axis of said shafts, one of said elements having one end pivotally connected to one of said members and to the second shaft and another end slidable along the other member, and the other element having an end pivotally connected to the other member and to the second shaft and another end slidable along said one member, said elements having outer sides defining with said housing, with said members, with said disc and with said flange a pressure chamber in said compartment, and said elements constituting the movable walls of said chamber; pump means driven at the rotational speed of said shafts and having a pressure side connected with the pressure chamber for delivering into the latter a hydraulic fluid at pressures which vary proportionally with the rotational speed of said shafts whereby the fluid pivots said elements and the elements angularly displace one of the shafts with respect to the other shaft; and resilient means operating between said elements for constantly biasing the same against the action of fluid pressure in said chamber.

5. In a hydraulic adjusting system, in combination: a housing defining therewithin a sealed compartment and having a pair of coaxial bores communicating with said compartment; a first driven shaft mounted in one of said bores and having a discoid flange in said compartment; a second shaft driven at the speed of said first shaft and mounted in the other bore of said housing; a disc rotatably supported by the second shaft in said compartment; a pair of symmetrically arranged substantially half-moon shaped members fixed to said flange and to said disc and forming a rigid unit with the first shaft; four cylindrical joints having axes parallel with the common axis of said shafts, one of said joints rotatably mounted in each of said members at diametrically opposed sides of the second shaft, and two of said joints rotatably mounted in said second shaft at diametrically opposed sides thereof and between the joints in said members; a pair of substantially wing-shaped elements mounted for pivotal movements in a plane perpendicular to the common axis of said shafts between said flange and said disc, one of said elements having one end fixed to the joint in one of said members and to one joint in said second shaft and a sealing surface slidable along the other member, and the other element having one end connected to the joint in the other member and to the other joint in said second shaft and a sealing surface slidable along said one member, said elements having outer sides adjacent to the sealing surfaces thereof defining with said housing, with said members, with said disc and with said flange a pressure chamber in said compartment, and said elements constituting the movable walls of said chamber; pump means driven at the rotational speed of said shafts and having a pressure side connected with the pressure chamber for delivering into the latter a hydraulic fluid at pressures which vary proportionally with the rotational speed of said shafts whereby the fluid pivots said elements about the joints in said members and the elements angularly displace one of the shafts with respect to the other shaft; and resilient means operating between said elements for constantly biasing the same against the action of fluid pressure in said chamber.

6. In a hydraulic adjusting system, in combination: a housing defining therewithin a sealed cylindrical compartment and having a pair of coaxial bores communicating with said compartment; a first driven shaft mounted in one of said bores and having a discoid flange in said compartment; a second shaft driven at the speed of said first shaft and mounted in the other bore of said housing; a disc rotatably supported by the second shaft in said compartment; a pair of symmetrically arranged substantially half-moon shaped members fixed to said flange and to said disc and forming a rigid unit with the first shaft; a pair of substantially wing-shaped elements mounted for pivotal movements between said flange and said disc in a plane perpendicular to the common axis of said shafts, one of said elements having one end pivotally connected to one of said members and to the second shaft and another end slidable along the other member, and the other element having an end pivotally connected to the other member and to the second shaft and another end slidable along said one member, said elements having outer sides defining with said housing, with said members, with said disc and with said flange a two-portion pressure chamber in said compartment, and said elements constituting the movable walls of said chamber, the diameters of said flange and of said disc being less than the diameter of said compartment whereby an annular space is formed about said members, about said flange and about said disc for communicatively connecting the portions of said chamber; pump means driven at the rotational speed of said shafts and having a pressure side connected with the pressure chamber for delivering into the latter a hydraulic fluid at pressures which vary proportionally with the rotational speed of said shafts whereby the fluid pivots said elements toward each other and the elements angularly displace one of the shafts with respect to the other shaft; and resilient means operating between said elements for constantly biasing the same in a direction away from each other and against the action of fluid pressure in said chamber.

7. In a hydraulic adjusting system, in combination: a housing defining therewithin a sealed compartment and having a pair of coaxial bores communicating with said compartment; a first driven shaft mounted in one of said bores and having a discoid flange in said compartment; a second shaft driven at the speed of said first shaft and mounted in the other bore of said housing; a disc rotatably supported by the second shaft in said compartment; a pair of symmetrically arranged substantially half-moon shaped members fixed to said flange and to said disc and forming a rigid unit with the first shaft; a pair of substantially wing-shaped elements mounted for pivotal movements between said flange and said disc in a plane perpendicular to the common axis of said shafts, one of said elements having an end pivotally connected to one of said members and to the second shaft and a sealing surface slidable along the other member, and the other element having an end pivotally connected to the other member and to the second shaft and a sealing surface slidable along said one member, said elements having outer sides adjacent to said sealing surfaces thereof defining with said housing with said members, with said disc and with said flange a pressure chamber in said compartment with said elements constituting the movable walls of said chamber, said elements further defining with said flange, with said disc and with said members an inner chamber for collecting pressure fluid escaping from said pressure chamber; a source of pressure fluid connected with said inner chamber; pump means driven at the rotational speed of said shafts, said pump means having a suction side connected with said source and a pressure side connected with said pressure chamber for delivering into the latter pressure fluid at pressures which vary proportionately with the rotational speed of said shafts whereby the fluid in the pressure chamber pivots said elements and the latter angularly displace one of the shafts with respect to the other shaft; and resilient means in the inner chamber operating between said elements for constantly biasing the same against the action of fluid in said pressure chamber.

8. In a hydraulic adjusting system, in combination: a housing defining therewithin a sealed cylindrical compartment and having a pair of coaxial bores communicating with said compartment and a pair of annular channels each of which communicates with one of said bores; a first driven shaft mounted in one of said bores, having a discoid flange in said compartment, and formed with bore means communicating with one of said channels; a second shaft driven at the speed of said first shaft and mounted in the other bore of said housing, said second shaft having bore means communicating with the bore means in said first shaft and with the other channel; a disc rotatably supported by the second shaft in said compartment; a pair of symmetrically arranged substantially half-moon shaped members fixed to said flange and to said disc and forming a rigid unit with the first shaft; a pair of substantially wing-shaped elements mounted for pivotal movements between said flange and said disc in a plane perpendicular to the common axis of said shafts, one of said elements having an end pivotally connected to one of said members and to the second shaft and a sealing surface slidable along the other member, and the other element having an end pivotally connected to the other member and to the second shaft and a sealing surface slidable along said one member, said elements having outer sides adjacent to said sealing surfaces thereof defining with said housing, with said members, with said disc and with said flange a two-portion pressure chamber in said compartment with said elements constituting the movable walls of said chamber, said elements further defining with said flange, with said disc and with said members an inner chamber for collecting pressure fluid escaping from said pressure chamber, said inner chamber communicating with the bore means in said shafts; the diameters of said disc and of said flange being less than the diameter of said compartment whereby an annular space is formed about said members, about said disc and about said flange for communicatively connecting the portions of said pressure chamber; a source of pressure fluid connected with one of said channels; pump means driven at the rotational speed of said shafts, said pump means having a suction side connected with said source and a pressure side connected with said pressure chamber for delivering into the latter pressure fluid at pressures which vary proportionately with the rotational speed of said shafts whereby the fluid in the pressure chamber pivots said elements and the latter angularly displace one of the shafts with respect to the other shaft; and resilient means in the inner chamber operating between said elements for constantly biasing the same against the action of fluid in said pressure chamber.

References Cited in the file of this patent

UNITED STATES PATENTS 2,436,669     Rausenberger     Feb. 24, 1948

FOREIGN PATENTS 74,663     Switzerland     Mar. 16, 1917